(12) United States Patent
Simon et al.

(10) Patent No.: US 8,746,583 B2
(45) Date of Patent: *Jun. 10, 2014

(54) THERMOSTAT ASSEMBLY WITH REMOVABLE COMMUNICATION MODULE AND METHOD

(71) Applicant: Tim Simon, Inc., San Francisco, CA (US)

(72) Inventors: Timothy M. Simon, San Francisco, CA (US); Matthew T. Fisher, Reno, NV (US)

(73) Assignee: Tim Simon, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/794,426

(22) Filed: Mar. 11, 2013

(65) Prior Publication Data

US 2013/0186964 A1 Jul. 25, 2013

Related U.S. Application Data

(63) Continuation of application No. 12/363,041, filed on Jan. 30, 2009, now Pat. No. 8,393,550.

(51) Int. Cl.
*G05D 23/00* (2006.01)

(52) U.S. Cl.
USPC ............................................ 236/94; 700/276

(58) Field of Classification Search
USPC ................... 236/51, 94; 700/276; 709/230
See application file for complete search history.

(56) References Cited

U.S. PATENT DOCUMENTS

| | | | |
|---|---|---|---|
| 5,833,134 A | 11/1998 | Ho et al. | |
| 5,927,599 A | 7/1999 | Kath | |
| 6,213,404 B1 | 4/2001 | Dushane et al. | |
| 6,394,359 B1 | 5/2002 | Morgan | |
| 6,619,055 B1 | 9/2003 | Addy | |
| 6,622,925 B2 | 9/2003 | Carner et al. | |
| 6,731,201 B1 | 5/2004 | Bailey et al. | |
| 6,997,390 B2 | 2/2006 | Alles | |
| 7,203,777 B2 | 4/2007 | Morita et al. | |
| 7,382,797 B2 | 6/2008 | Noone et al. | |
| 7,415,102 B2 | 8/2008 | Iggulden et al. | |
| 8,393,550 B2 | 3/2013 | Simon et al. | |
| 2006/0097063 A1 | 5/2006 | Zeevi | |
| 2006/0196953 A1 | 9/2006 | Simon et al. | |
| 2007/0114295 A1 | 5/2007 | Jenkins | |
| 2007/0271006 A1 | 11/2007 | Golden et al. | |
| 2008/0011864 A1 | 1/2008 | Tessier et al. | |

(Continued)

OTHER PUBLICATIONS

"Wireless Radio Thermostat Zone Control—No hassle, Plug and Play" manufactured by SyxthSense Ltd., Berkshire, UK; Product information foundonline at: www.syxthsense.co.uk/ecommerce2/rf.sub.--thermostats.php; Jan. 9, 2009; 1 pg.

*Primary Examiner* — Marc Norman
(74) *Attorney, Agent, or Firm* — James F. Hann; Haynes Beffel & Wolfeld LLP (57) ABSTRACT

A thermostat assembly comprises a thermostat and a removable and replaceable first communication module physically and functionally removably connected to the thermostat. The first communication module is configured to permit information transfer between the thermostat and a first device remote from the thermostat. If more than one communication module is used to communicate with more than one device, the communication modules may operate using different communication protocols.

19 Claims, 5 Drawing Sheets

(56) References Cited

U.S. PATENT DOCUMENTS

| | | |
|---|---|---|
| 2008/0185451 A1 | 8/2008 | Simon et al. |
| 2008/0224886 A1 | 9/2008 | Rodriguez et al. |
| 2013/0261803 A1* | 10/2013 | Kolavennu .................. 700/276 |

* cited by examiner

THERMOSTAT ASSEMBLY WITH REMOVABLE COMMUNICATION MODULE AND METHOD

CROSS REFERENCE TO RELATED APPLICATIONS

The present application is a continuation of U.S. patent application Ser. No. 12/363,041, filed 30 Jan. 2009 (now U.S. Pat. No. 8,393,550), entitled THERMOSTAT ASSEMBLY WITH REMOVABLE COMMUNICATION MODULE AND METHOD; which is incorporated herein by reference.

BACKGROUND OF THE INVENTION

The present invention relates generally to thermostats used for heating and cooling systems, such as gas or electric forced air furnaces, gas or electric radiant heating furnaces, electric forced air air-conditioning systems, and electric heat pumps.

One conventional thermostat sold by Home Depot of Atlanta, Ga. as the RiteTemp® 6020Z controls the furnace/air-conditioner (HVAC) using a low power radio transmitter. In addition, this thermostat can be used in a system to receive information from and provide signals to other devices such as alarm systems, outside lighting, etc. A similar system having additional features and capabilities is disclosed in U.S. Patent publication number US 2006/0196953. Another example of a radio thermostat is shown in US patent publication US 2008/0185451. The disclosures of these patent publications are incorporated by reference.

During peak power demands a power company needs to have users on the power grid cut back on power consumption to avoid blackouts. One known way to do this is to send a signal to a specially designed power meter that a power-save state exists. The power meter receives the power-save signal and instructs the air-conditioner to increase the target temperature without delay by, for example, 4° F., the power-save state. In exchange for permitting the power company to have such temporary control, the user will typically receive power at a reduced rate structure. Thermostats are often linked to other devices and systems by wireless connections. These thermostats, often called communicating thermostats, are typically used to communicate with the heating and cooling systems, remote controllers, or devices for controlling air flow through different parts of the building. Some communicating thermostats communicate with the power company through the power meter to, for example, provide some level of control to the power company during energy emergencies.

BRIEF SUMMARY OF THE INVENTION

One aspect of the invention is the recognition that while communicating thermostats are very useful, the fact that remote communication devices are constructed using different radio communication protocols, such as ZigBee, Z-wave, 6LowPAN, RDS and WiFi, means that there is a high likelihood of device incompatibility between, for example, an existing radio-type communicating thermostat and a newly added device with which the communicating thermostat is to communicate. For example, assume a conventional radio-type communicating thermostat installation is designed to communicate with its associated HVAC system and remote thermostat controllers using one type of RF communication protocol, such as ZigBee. It would not be possible to easily communicate with another device, such as the utility's power meter, using another type of communication protocol, such as WiFi.

A first aspect of the invention is directed to a thermostat assembly comprising a thermostat and a removable and replaceable first communication module physically and functionally removably connected to the thermostat. The first communication module is configured to permit information transfer between the thermostat and a first device remote from the thermostat.

In some examples the thermostat assembly includes a removable and replaceable second communication module physically and functionally removably connected to the thermostat, the second communication module configured to permit information transfer between the thermostat and a second device remote from the thermostat. The first and second communication modules may operate using different communication protocols.

In some examples the thermostat of the thermostat assembly comprises a housing having an outer surface. The first communication module has first and second side edges on opposite sides thereof, and an inner edge joining the first and second side edges. The housing has an open region sized for at least partially containing the communication module therein. The open region has first and second opposed side walls, an end wall joining the side walls, and an opening opposite the end wall through which the communication module can pass (1) when inserted through the opening to a docked position within the open region, and (2) when removed from the open region. The first and second side edges comprise side edge alignment elements. The first and second side walls comprise sidewall alignment elements. The side edge alignment elements and the sidewall alignment elements are configured for complementary mating engagement when the communication module is placed into the docked position.

Another aspect of the invention is directed to a method for setting up a thermostat for remote communication with a device and is carried out as follows. A thermostat usable with a removable and replaceable communication module is selected. The radio communication protocol for a device with which the thermostat is to communicate is determined. A removable and replaceable communication module that is physically and functionally removably connectable to the thermostat and that uses said radio communication protocol is obtained. The removable and replaceable communication module is operably mounted to the thermostat to permit the thermostat to communicate with the device using the radio communication protocol. In some examples the selecting step is carried out by selecting a thermostat usable with first and second removable and replaceable communication modules.

Various features and advantages of the invention will appear from the following description in which the preferred embodiments have been set forth in detail in conjunction with the accompanying drawings.

DETAILED DESCRIPTION OF THE INVENTION

The following description will typically be with reference to specific structural embodiments and methods. It is to be understood that there is no intention to limit the invention to the specifically disclosed embodiments and methods but that the invention may be practiced using other features, elements, methods and embodiments. Preferred embodiments are described to illustrate the present invention, not to limit its scope, which is defined by the claims. Those of ordinary skill in the art will recognize a variety of equivalent variations on the description that follows. Like elements in various embodiments are commonly referred to with like reference numerals.

Figures 1, 2:
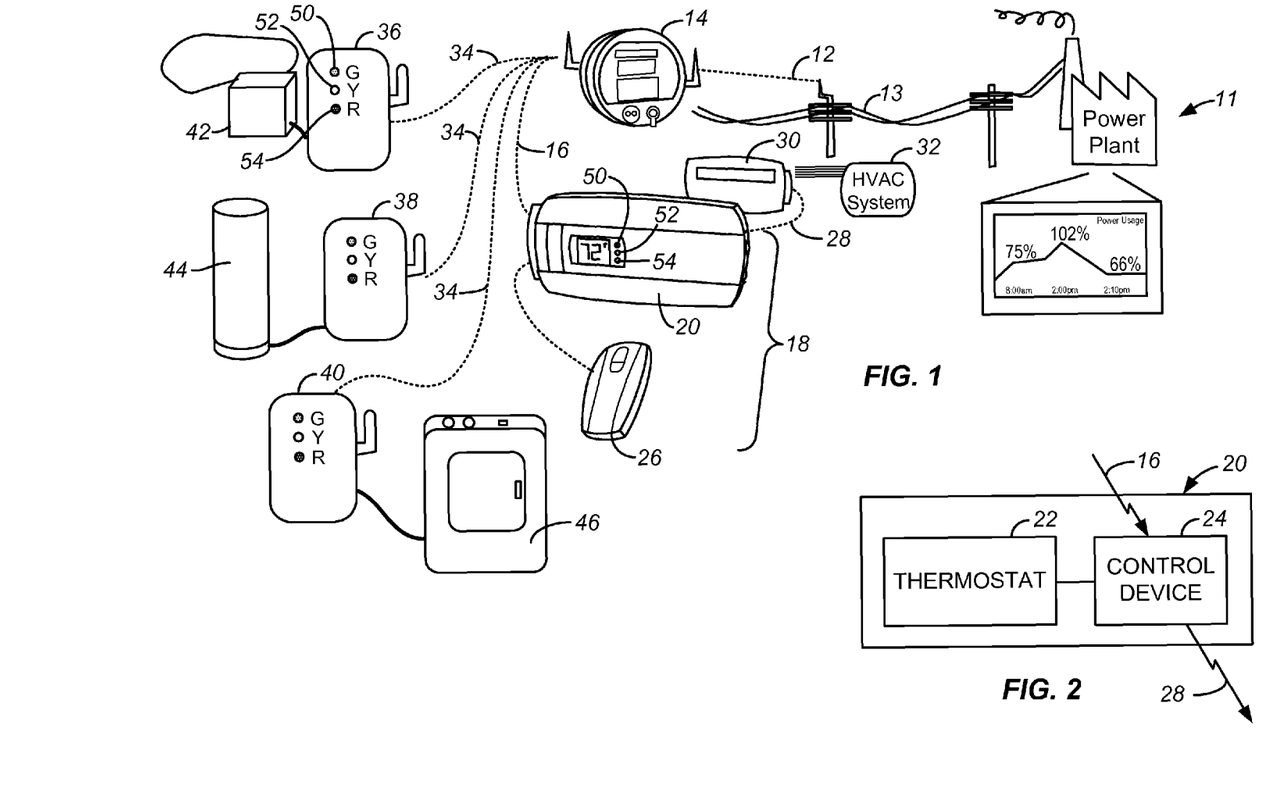
FIG. 1 is a schematic view of an example of an energy control system in which the power company communicates with a customer through a power meter to provide a level of control over power usage by the customer.
FIG. 2 is a simplified view of a housing containing a thermostat and a control device.
Figure 3:
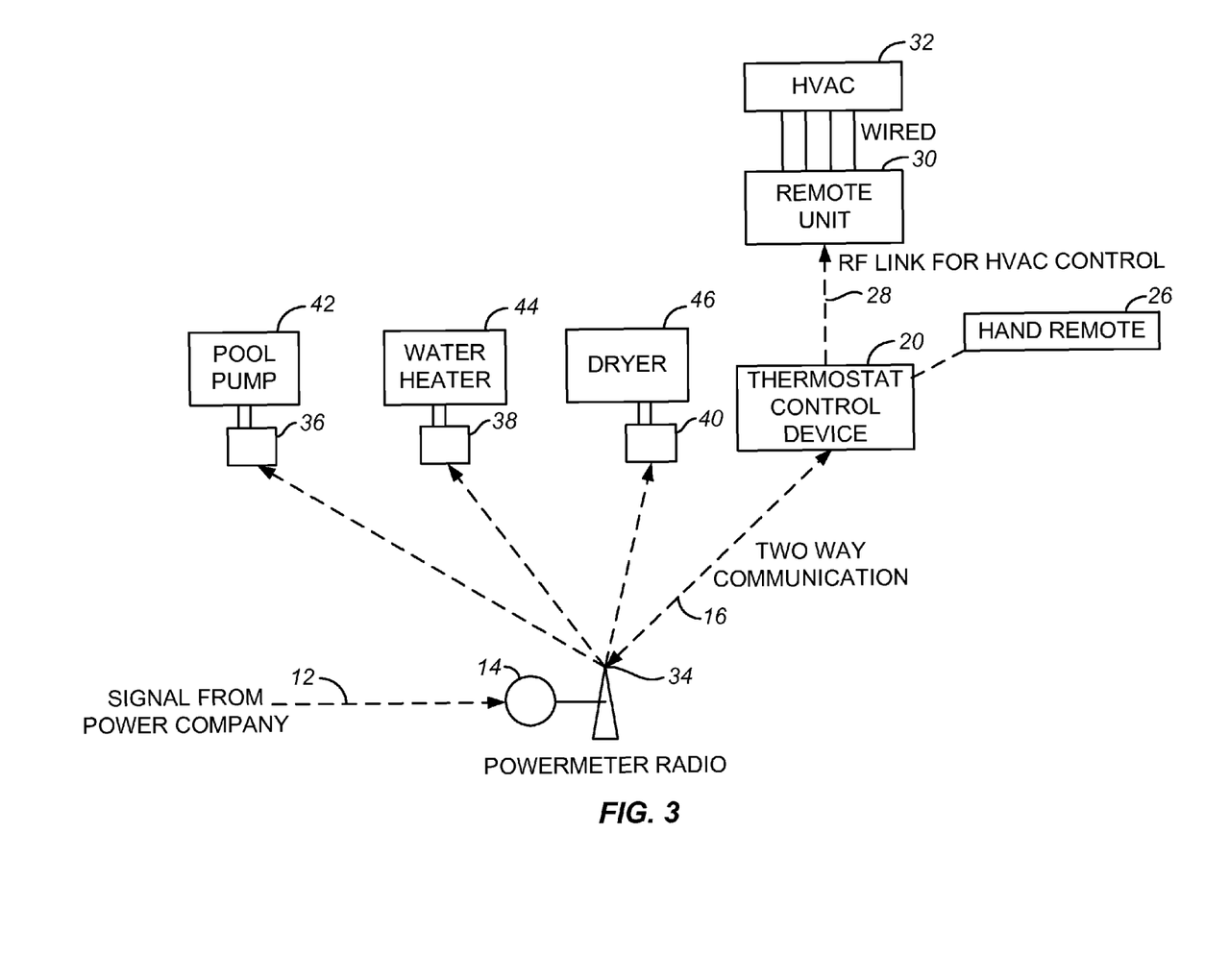
FIG. 3 illustrates various lines of communication among the various devices of FIG. 1.

The basic concept for an energy control system 10 is illustrated in FIGS. 1, 2 and 3. In some examples the power company 11 sends out an alert, sometimes called first power-save signal 12, which is received by the user's power meter 14. Power-save signal 12 is typically transmitted along electrical lines 13. The user's power meter 14 then sends a second power-save signal 16 to a radio thermostat 18, also called a combination control device 18. In the example of FIGS. 1, 2 and 3, combination control device 18 includes a common housing 20, containing a thermostat 22 and a control device 24, and a remote control 26. Control device 24 includes a radio transceiver to provide the remote communication capabilities for the combination control device 18. The control device 24 tells the thermostat 22 to change the target temperature by, for example, raising it 3° when the air-conditioner is being used. This can be achieved by the control device 24 sending an appropriate control signal 28 to the HVAC receiver unit 30 which in turn sends an appropriate signal to the HVAC system 32.

With some embodiments of the invention the thermostat also sends out third power-save signals 34 to various power-save adapters 36, 38, 40. Each power-save adapter controls the power to an energy-consuming unit, such as a pool heater pump 42, a water heater 44, and an electric clothes dryer 46. The power-save adapter is responsive to the third power-save signal 34 permitting limited operation of the energy-consuming unit and at least substantially preventing operation of the energy-consuming unit for a period of time, or until receipt of a power-alert-over signal. The power-save adapter could be a separate module or an integral part of the energy-consuming unit. Also, a single power-save adapter may be associated with and control two or more energy-consuming units. For example, upon receiving the third power-save signal by the electric dryer power-save adapter 40, the adapter permits the clothes dryer to relatively promptly start a new drying cycle or to finish any currently running drying cycle, but thereafter at least substantially prevents operation of the clothes dryer for a period of time, such as for six hours or, for example, until 6 p.m. or until receipt of a power-alert-over signal. Also, upon receiving the third power-save signal 34 by the hot water heater power-save adapter 38, the adapter permits the hot water heater to start or to continue to heat the water within the hot water heater but thereafter at least substantially prevents operation of the hot water heater for a water heater period of time, such as for six hours or, for example, until 6 p.m. or until receipt of a power-alert-over signal. Permitting limited operation of the energy-consuming unit during a power-save state helps to reduce the impact on the user from the need to cut power consumption.

In the example of FIGS. 1-3, signals 34 are sent directly from power meter 14 to one or more of power-save adapter 36, 38, 40. This assumes that the radio receiver or transceiver associated with each power-save adapter 36, 38, 40 uses the same communication protocol as does power meter 14. In the example discussed below with reference to FIGS. 4-9, power meter 14 communicates only with radio thermostat 18, which in turn communicates directly with the individual energy-consuming units or through associated power-save adapters. This may be done, for example, for control reasons or when communication with one or more of the energy-consuming units use a communication protocol different from power meter 14.

One or more of the devices associated with the system may provide an indication of the alert status. For example, in some embodiments the power save adapters and the thermostat each have three colored LEDs, a green LED 50 indicating no power-save signal in effect, a yellow LED 52 indicating a power-save signal has been received but the delay time has not expired (still within the 10 a.m.-12 noon period in the above example), and a red LED 54 indicating a power-save state is currently in effect. In some examples yellow LED 52 indicates that the power company has sent a signal for users to give the user the opportunity to voluntarily decrease power consumption to avoid paying higher rates. The alert status signal may be, for example, visible, audible, electronic, or a combination. They signal would be especially helpful to permit a user to start a new operating cycle and complete it before the start of the power-save state. In the examples in which the power company transmits a price event signal and an emergency event signal, a green LED can indicate normal operation, a yellow LED can indicate a price event signal has been received and is currently in effect so that a user may or may not configure their system to curtail power usage as a response, and a red LED can indicate an emergency event signal has been received and is currently in effect.

In addition to signaling the energy alert status received from the power company, the alert LEDs 50, 52, 54 on the thermostat, as well as other components such as power save adapters 36, 38, 40 and the HVAC receiver unit 30, can be used to signal for other conditions. For example, a remotely placed water sensor could be used to provide a signal to a sump pump controller indicating whether the pump is to be running or not. The pump controller could provide a signal to the thermostat 22, or some other component including alert LEDs, of the pumping status, such as the pump is running, the pump is clogged, the pump is off, or the pump needs to be checked. In addition, the alert LEDs could be used to signal the status of other things, such as mail has been received in a mailbox, a doorbell has been rung or a garage door has been opened. Such multiple uses for the LEDs, or other signaling devices, could be accomplished by using an alert select switch, or by programming the alert LEDs to have different illumination patterns for different alerts, or by doing both. For example, the alert LEDs 50, 52, 54 could be designed to stay constantly illuminated for power save statuses, to have the green LED 50 blink for a mail received status, to have the yellow LED 52 blink for a doorbell rung status and to have the red LED 54 blink when the garage door has been opened. FIGS. 1-3 and the above description of those Figs. are largely taken from US patent publication US 2008/0185451.

Figure 4:
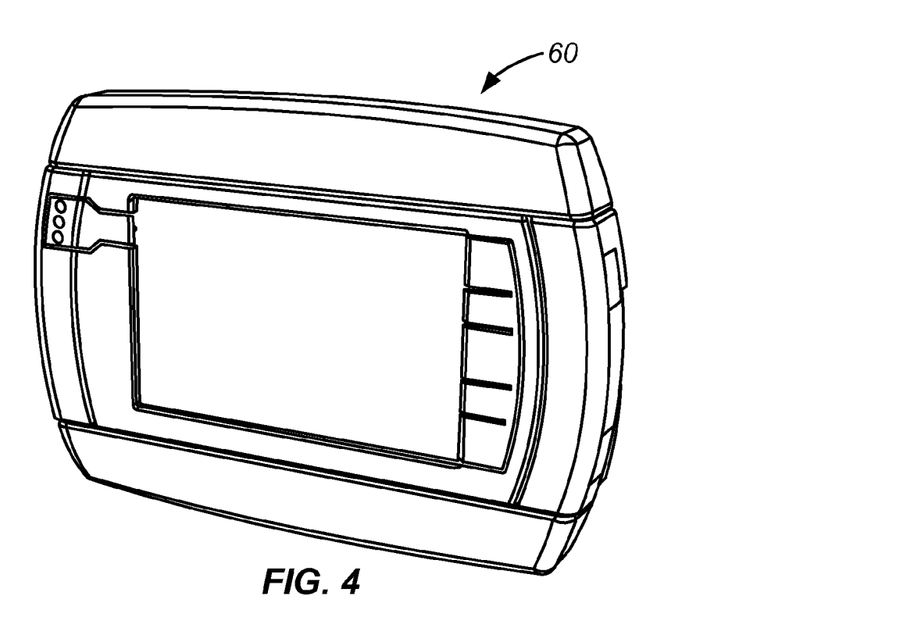
FIG. 4 is a front, top, right side view of a thermostat made according to the invention.
Figure 5:
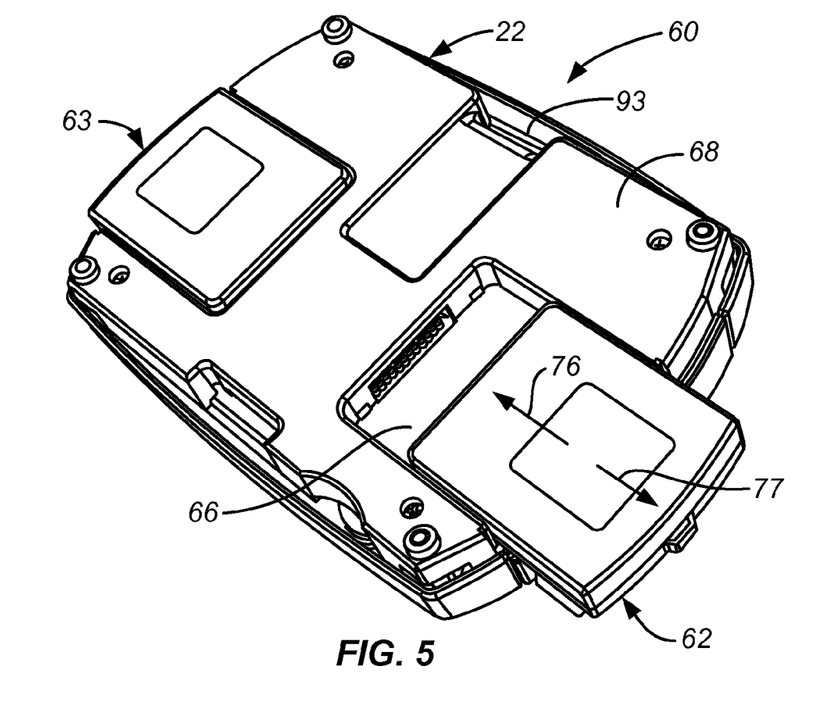
FIG. 5 is a back, bottom, left side view of the thermostat of FIG. 4 illustrating one removable and replaceable communication module in a fully docked position within an open region and a second communicate and module in a partially docked position.

FIGS. 4 and 5 illustrate a radio thermostat 60, also called a thermostat assembly 60, designed to have great flexibility in communicating with different devices. Thermostat assembly 60 includes thermostat 22 and one or two communication modules 62, 63. The back 64 of thermostat 22 has, in this example, two open regions 66 each sized to accept a communication module 62. Each communication module 62, 63 preferably acts as a radio transceiver and typically operates using a different communication protocol such as ZigBee, Z-wave, 6LowPAN, RDS or WiFi. The use of both communication modules 62, 63 allows thermostat assembly 60 to communicate with devices using different communication protocols. Thermostat 22 can be provided separately from communication modules 62, 63 so that the particular communication modules required for a particular installation can be selected. Although thermostat assembly 60 is shown with the capability for accommodating two communication modules 62, 63, the invention encompasses the concept of thermostat 22 accommodating at least one in preferably two or more removable and replaceable communication modules.

Figure 6:
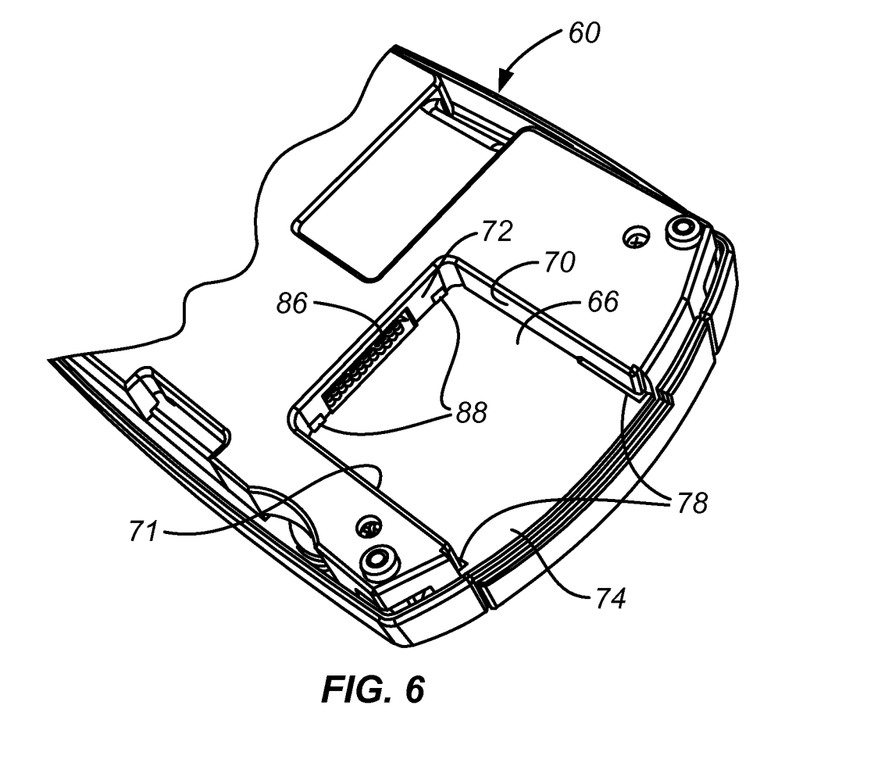
FIG. 6 is a somewhat enlarged view of a part of the thermostat of FIG. 5 with the communication module completely removed from the open region.
Figure 7:
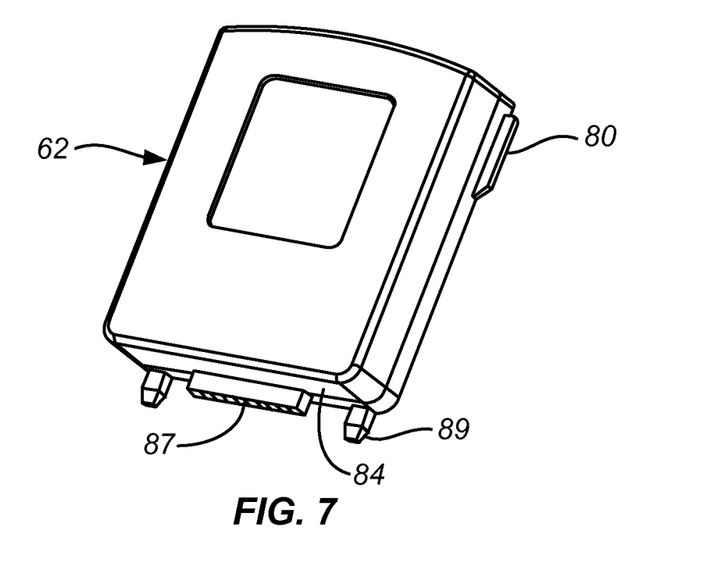
FIG. 7 is an isometric view of a communication module illustrating its alignment elements.

Housing 20 has an outer surface 68 defining the open regions 66. Open regions 66 are each sized to at least partially contain a communication module 62, 63. Each open region 66 has first and second opposed side walls 70, 71, an end wall 72 joining the side walls, and an opening 74 opposite the end wall through which a communication module 62, 63 can pass. This permits a communication module 62, 63 to be inserted through opening 74 in the direction of arrow 76 in FIG. 5 to a docked position within open region 66 (see communication module 63 in FIG. 5), and to be removed from the open region as indicated by arrow 77 in FIG. 5. Side walls 70, 71 have sidewall alignment elements in the form of guide fin slots 78 sized and positioned to accept side edge alignment elements in the form of guide fins 80 extending laterally away from the side edges 82 of communication modules 62, 63. That is, guide fin slots 78 and guide fins 80 are configured for complementary meeting engagement when a communication module 62, 63 is placed into the docked position. If desired, guide fins 80 could be part of side walls 70, 71 with guide fin slots 78 formed into side edges 82. Communication module 62 also includes an inner edge 84 joining the side edges 82. End wall 72 and inner edge 84 have electrical connectors 86, 87 that mate when communication module 62 is in the docked position. End wall 72 and inner edge 84 have docking alignment elements 88, 89 sized for complementary mating engagement when the communication module is in the docked position. Docking alignment elements 88, 89 are, in this example, in the form of guide pin holes 88 for docking alignment elements 88 and guide pins 89 for docking alignment elements 89. The location of these docking alignment elements 88, 89 could also be reversed.

Figure 8:
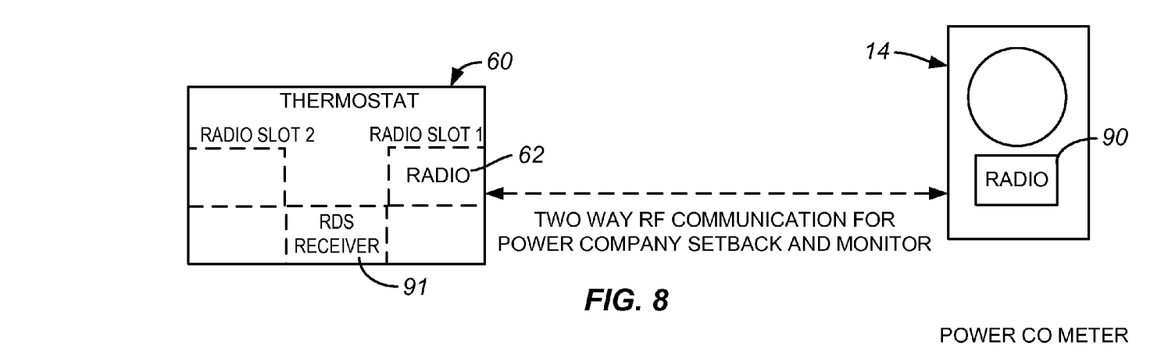
FIG. 8 is a diagram of the radio thermostat having a single communication module communicating with a radio transceiver of a power meter.

FIG. 8 illustrates an example using a radio thermostat 60 to communicate with a single device, in this case power meter 14. The user can obtain thermostat 22 and then choose a communication module 62 depending on the type of radio transmitter or transceiver 90 used by power meter 14. This ability to separately pair thermostat 22 with the appropriate communication module 62 eliminates the need to stock a separate model of radio thermostat 60 for each communication protocol; it is much simpler and less expensive to stock a number of communication modules 62 each with its own communication protocol for use with a single thermostat 22 then to stock a different radio thermostat 60 for each communication protocol expected to be encountered. In this type of system power company 11 can give, for example, price, usage and event information to the user, perform a thermostat target temperature setback during a power crisis, as well as monitor for individual power usage. FIG. 8 also illustrates an RDS receiver 91, which is a special frequency FM receiver required by some governmental agencies. An opening 93 for RDS receiver 91 is shown in FIG. 5. RDS receiver 91 is used to, for example, permit the governmental agency to set back a thermostat 60 during power emergencies by broadcasting an FM radio signal.

Figure 9:
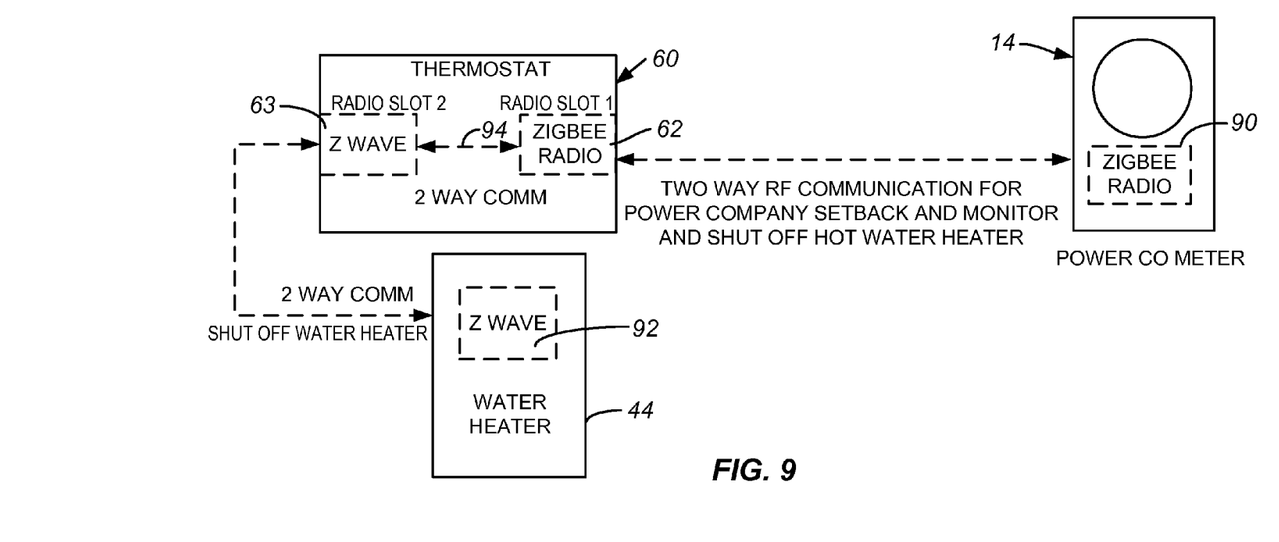
FIG. 9 is a diagram similar to that of FIG. 8 in which the radio thermostat has two communication modules for communication with the radio transceiver of a power meter and also with the radio transceiver of a water heater using different communication protocols.

FIG. 9 illustrates a radio thermostat 60 in which communication module 62 has been chosen to conform to the communication protocol of radio transceiver 90 of power meter 14, in this example the Zigbee protocol. However, the radio transceiver associated with water heater 44 uses a different communication protocol, and this example Z-wave. To enable radio thermostat 60 to communicate with water heater 44, communication module 63 is chosen to operate with the same Z-wave communication protocol. This permits communication between radio thermostat 60 and water heater 44. Therefore, commands to water heater 44 may be provided through radio thermostat 60. These commands could emanate by the user inputting a command directly into radio thermostat 60 or could be commands from power company 11 through power meter 14 by virtue of a communication link 94 between communication modules 62, 63. The ability to choose communication module 62, 63 having the desired communication protocol greatly enhances the ability of thermostat 22 to be used with a variety of devices in a manner that would otherwise not be practical. For example, assume it is desired to have a thermostat that can communicate with two different devices using five different communication protocols. With a thermostat having two different preinstalled radio transceivers, a total of ten different radio thermostats would be need to be stocked to cover all the possible combinations. This would be an unrealistic, uneconomical number. It would be much simpler to stock radio thermostat 60 and five different, relatively inexpensive communication modules 62, 63.

With a thermostat 60 designed for use with two or more communication module 62, 63, a great deal of flexibility can be had in its use. For example, the power company could be monitoring and asserting some sort of a control over thermostat 60 while an alarm company could monitor the thermostat using the same communication protocol or a different communication protocol. The user could monitor and control thermostat 60 by way of a telephone by using a communication module 62 that incorporates a cellular telephone. The user could also monitor and control thermostat 60 from a computer source using a wireless communication capability of the computer source. Also, conventional repeaters can be used as necessary to relay commands to increase the wireless communication range and thus increase reliability; such relays accept any type of communication protocol.

Other modification and variation can be made to the disclosed embodiments without departing from the subject of the invention as defined in following claims. For example, communication modules 62, 63 that mount to thermostat 22 in different ways can be used. Thermostat 60 can be constructed so that more than two communication modules 62, 63 can be used. Radio thermostat 60 can be used in systems in which power company 11 can communicate with or control one or more energy-consuming units directly, as in FIGS. 1-3, and also communicate with the same or different energy-consuming units through radio thermostat 60, as in FIGS. 4-9.

While the invention has been described in which communication modules 62, 62 are radio communication modules, therefore using the RF portion of the electromagnetic spectrum, other electromagnetic frequency ranges may also be used. The other frequency ranges may be above or below the RF range, including UHF and frequency ranges in the light spectrum, including visible light, infrared light and ultraviolet light. Communication modules using transmissions in other than the electromagnetic spectrum, such as sound waves, may also be used.

Any and all patents, patent applications, and printed publications referred to above are incorporated by reference.

The invention claimed is:

1. A thermostat assembly comprising:
   a thermostat;
   a first communication module physically and functionally connected to the thermostat;
   the first communication module being operable using a first communication protocol and configured to permit information transfer between the thermostat and a first device remote from the thermostat;
   a second communication module physically and functionally connected to the thermostat; and
   the second communication module being operable using a second communication protocol and configured to permit information transfer between the thermostat and a second device remote from the thermostat.

2. The thermostat assembly according to claim 1, wherein at least one of the communication modules is physically and functionally removably connected to the thermostat.

3. The thermostat assembly according to claim 1, wherein the first and second communication modules are physically and functionally removably connected to the thermostat.

4. The thermostat assembly according to claim 1, wherein the first device comprises a power meter.

5. The thermostat assembly according to claim 1, wherein the second device comprises a computer source.

6. The thermostat assembly according to claim 1, wherein the first device comprises a power meter and the second device comprises a computer source.

7. The thermostat assembly according to claim 1, wherein the second device comprises an energy consuming unit.

8. The thermostat according to claim 1, wherein the first device comprises a power meter and the second device comprises an energy consuming unit.

9. The thermostat assembly according to claim 1, wherein the thermostat comprises a communication link between the first and second communication modules.

10. The thermostat assembly according to claim 1, wherein:
    the thermostat comprises a housing; and
    the housing comprises first and second regions for receipt of the first and second communication modules so that the first and second communication modules are physically and functionally removably connectable to the housing.

11. A method for setting up a thermostat for remote communication with devices spaced apart from the thermostat, comprising:
    selecting a thermostat usable with first and second removable and replaceable communication modules;
    determining a first radio communication protocol for a first device with which the thermostat is to communicate and a second radio communication protocol for a second device with which the thermostat is to communicate, the first and second devices being spaced apart from the thermostat;
    obtaining first and second removable and replaceable communication modules that are physically and functionally removably connectable to the thermostat and that use said first and second radio communication protocols, respectively; and
    operably mounting the removable and replaceable communication modules to the thermostat to permit the thermostat to communicate with the first and second devices using said radio communication protocols.

12. The method according to claim 11, wherein the determining step comprises determining a first radio communication protocol for use with a power meter as the first device.

13. The method according to claim 11, wherein the determining step comprises determining a second radio communication protocol for use with a computer source as the second device.

14. The method according to claim 11, wherein the determining step comprises determining a first radio communication protocol for use with a power meter as the first device and determining a second radio communication protocol for use with a computer source as the second device.

15. The method according to claim 11, wherein the determining step comprises determining a second radio communication protocol for use with an energy consuming unit as the second device.

16. The method according to claim 11, wherein the determining step comprises determining a first radio communication protocol for use with a power meter as the first device and determining a second radio communication protocol for use with an energy consuming unit as the second device.

17. The method according to claim 11, wherein the determining step comprises determining different radio communication protocols for the first and second communication modules.

18. The method according to claim 11, wherein the selecting step comprises selecting a thermostat usable with more than two communication modules.

19. The method according to claim 11, wherein the radio communication protocols are selected from the following communication protocols: ZigBee, Z-wave, 6LowPAN, RDS and WiFi.

* * * * *